United States Patent
Zhou et al.

(10) Patent No.: US 8,936,733 B2
(45) Date of Patent: Jan. 20, 2015

(54) BORATE LUMINESCENT MATERIALS, PREPARATION METHODS AND USES THEREOF

(75) Inventors: Mingjie Zhou, Shenzhen (CN); Jun Liu, Shenzhen (CN); Wenbo Ma, Shenzhen (CN)

(73) Assignee: Ocean's King Lighting Science & Technology Co., Ltd., Shenzhen, Guangdong (CN)

(*) Notice: Subject to any disclaimer, the term of this patent is extended or adjusted under 35 U.S.C. 154(b) by 105 days.

(21) Appl. No.: 13/816,188

(22) PCT Filed: Aug. 19, 2010

(86) PCT No.: PCT/CN2010/076131
§ 371 (c)(1),
(2), (4) Date: Feb. 8, 2013

(87) PCT Pub. No.: WO2012/022041
PCT Pub. Date: Feb. 23, 2012

(65) Prior Publication Data
US 2013/0140492 A1   Jun. 6, 2013

(51) Int. Cl.
*C09K 11/63* (2006.01)
*C09K 11/87* (2006.01)
*C09K 11/77* (2006.01)

(52) U.S. Cl.
CPC ............. *C09K 11/87* (2013.01); *C09K 11/7712* (2013.01); *C09K 11/774* (2013.01); *C09K 11/7755* (2013.01); *C09K 11/7759* (2013.01); *C09K 11/778* (2013.01); *C09K 11/7797* (2013.01)
USPC .................................................. 252/301.4 R

(58) Field of Classification Search
USPC .................................................. 252/301.4 R
See application file for complete search history.

(56) References Cited

FOREIGN PATENT DOCUMENTS

| JP | H11-514701 A | 12/1999 |
|---|---|---|
| JP | 2002-015674 A | 1/2002 |
| JP | 2002-033055 A | 1/2002 |
| JP | 2008-537304 A | 9/2008 |
| WO | WO 2011/143288 | * 11/2011 |

OTHER PUBLICATIONS

Radha Velchuri, et al., Low Temperature Preparation and Characterization of In1-xLnxBO3 (x=0.0 and 0.05; Ln=Gd, Eu, Dy and Sm): ESR of In0.95Gd0.05BO3 and Emission of In0.95Eu0.05BO3, Spectrochimica Acta Part A 74 (2009) 726-730.

Yu-Lin Min, et al., Au@Y2O3:Eu3+ rare earth oxide hollow submicrospheres with encapsulated gold nanoparticles and their optical properties, Solid State Sciences 11 (2009) 96-101.

* cited by examiner

*Primary Examiner* — Carol M Koslow
(74) *Attorney, Agent, or Firm* — Shimokaji & Associates P.C.

(57) ABSTRACT

Borate luminescent materials, preparation methods and uses thereof are provided. The luminescent material is a blend of metal M nanoparticles and $(In_{1-x}Re_x)BO_3$, wherein Re is one or two selected from Tm, Tb, Eu, Sm, Gd, Dy and Ce, M is one or two selected from metal nano particles of Au, Ag, Pt or Pd, $0 < x \leq 0.5$, $0 < z \leq 1 \times 10^{-2}$. Compared to the luminescent materials in the prior art, the said luminescent materials have higher luminous intensity and luminous efficiency, which can be used in field emission displays or light source.

9 Claims, 1 Drawing Sheet

BORATE LUMINESCENT MATERIALS, PREPARATION METHODS AND USES THEREOF

FIELD OF THE INVENTION

The present invention relates to luminescent materials technology. More particularly, the present invention relates to borate luminescent materials, preparation methods and uses thereof.

BACKGROUND OF THE INVENTION

Luminescent materials excited by cathode ray comprise sulfide system and oxide system. The sulfide system comprises blue powder ZnS:Ag,Cl, $SrGa_2S_4$:Ce, green powder $SrGa_2S_4$:Eu and red powder $Y_2O_2S$:Eu. Although luminescent materials of sulfide system have higher luminosity, they have poor stability. The oxide system mainly contains blue powder $Y_2SiO_5$:Ce, green powder $ZnGa_2O_4$:Mn, $Y_2SiO_5$:Tb, $Y_3Al_5O_{12}$:Tb and red powder $Y_2O_3$:Eu. Oxide system has higher stability, but its luminosity and conductivity is not as good as sulfide system.

Borate luminescent materials are important luminescent materials excited by cathode ray, there are few reports about it, and they have advantages of high efficiency, low sintering temperature, simple and convenient synthesis, moderate particle size. But the luminescent intensity of the existent borate luminescent materials is not high, which restricted the applications of borate luminescent materials.

SUMMARY OF THE INVENTION

In view of this, the present invention provides borate luminescent materials with high luminous intensity, and preparation methods and uses of borate luminescent materials.

Borate luminescent material of the present invention is a blend of metal M nanoparticles and $(In_{1-x}Re_x)BO_3$.

wherein, x is in the range of $0<x\leq 0.5$, Re is rare-earth element, Re is one or two elements selected from Tm, Tb, Eu, Sm, Gd, Dy and Ce; M represents metal nano particles, M is any one or two metals selected from metal nano particles of gold, silver, platinum and palladium; z is in the range of $0<z\leq 1\times 10^{-2}$, z is the molar ratio of M to $(In_{1-x}Re_x)BO_3$.

Preparation methods of borate luminescent materials, comprising:

preparing metal M nano particles colloid: dissolving metal M compound in solvent to prepare solution of metal M compound; then adding assistant agent to obtain mixed solution; subsequently, adding reducing agent solution into mixed solution, after the complete reaction, adding polyvinylpyrrolidone, stirring, obtaining metal M nano particles colloid; wherein, M represents metal nano particles, M is any one or two metals selected from gold, silver, platinum and palladium;

preparing $(In_{1-x}Re_x)BO_3$ solution: according to the stoichiometric ratio of each element in the general formula $(In_{1-x}Re_x)BO_3$, weighing $In(NO_3)_3$, $Re(NO_3)_3$ and compound used as source of boron then adding into ethanol solution, dissolving and mixing to obtain mixed ethanol solution of $(In_{1-x}Re_x)BO_3$; wherein, x is in the range of $0<x\leq 0.5$, Re is rare-earth element, Re is one or two elements selected from Tm, Tb, Eu, Sm, Gd, Dy and Ce;

preparing a blend of metal M nanoparticles and $(In_{1-x}Re_x)BO_3$: according to the molar ratio z of M to $(In_{1-x}Re_x)BO_3$, adding the obtained metal M nano particles colloid into said mixed ethanol solution of $(In_{1-x}Re_x)BO_3$, heating in a water bath at 75° C. to 90° C., and drying to obtain precursors, pre-burning and calcining the precursors, then cooling, grinding, obtaining borate luminescent materials, wherein, z is the molar ratio of M to $(In_{1-x}Re_x)BO_3$, z is in the range of $0<z\leq 1\times 10^{-2}$.

And, uses of said borate luminescent materials in field emission display devices or light sources.

By the introduction of metal nano particles, taking the advantage of surface plasmon resonance effect of metal nano particles, said borate luminescent materials achieve significant enhancement to luminescent intensity and great increase of luminescent efficiency. By using boric acid or borate ester, heating in water bath, said preparation methods guarantee In, rare-earth elements and metal nano particles to mix well, the methods are also luminescent intensity assurance of prepared borate luminescent materials, meanwhile, said preparation methods are simple, no pollution, easy to control, low demand on equipment, easy to produce in industry.

DETAILED DESCRIPTION OF ILLUSTRATED EMBODIMENTS

Figure 1:
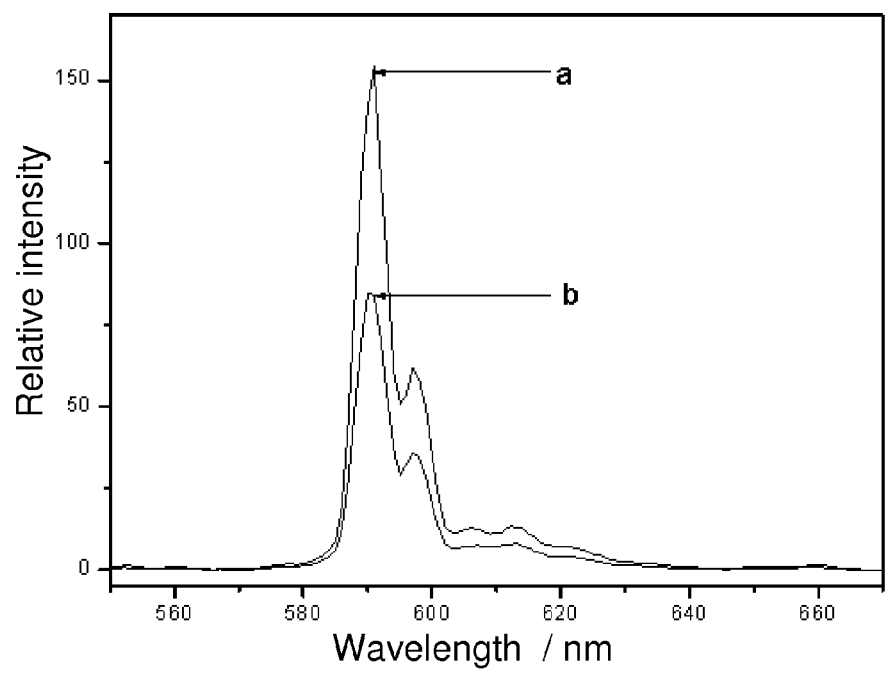
FIG. 1 is comparison luminescence spectrum of borate luminescent materials provided in the embodiments of the present invention, which is produced under the excitation of 3.0 kV cathode ray.

Further description of the present invention will be illustrated, which combined with embodiments in the drawings, in order to make the purpose, the technical solution and the advantages clearer. While the present invention has been described with reference to particular embodiments, it will be understood that the embodiments are illustrative and that the invention scope is not so limited.

The present invention provides borate luminescent materials, said borate luminescent material is a blend of metal M nanoparticles and $(In_{1-x}Re_x)BO_3$.

wherein, x is in the range of $0<x\leq 0.5$, Re is rare-earth element, M represents metal nano particles, z is the molar ratio of M to $(In_{1-x}Re_x)BO_3$, z is in the range of $0<z\leq 1\times 10^{-2}$; Re can be one or two elements selected from Tm, Tb, Eu, Sm, Gd, Dy and Ce; metal nano particles is preferably the metal nano particles with good surface plasmon resonance effect performance, such as gold, silver, palladium, platinum and so on.

Figure 2:
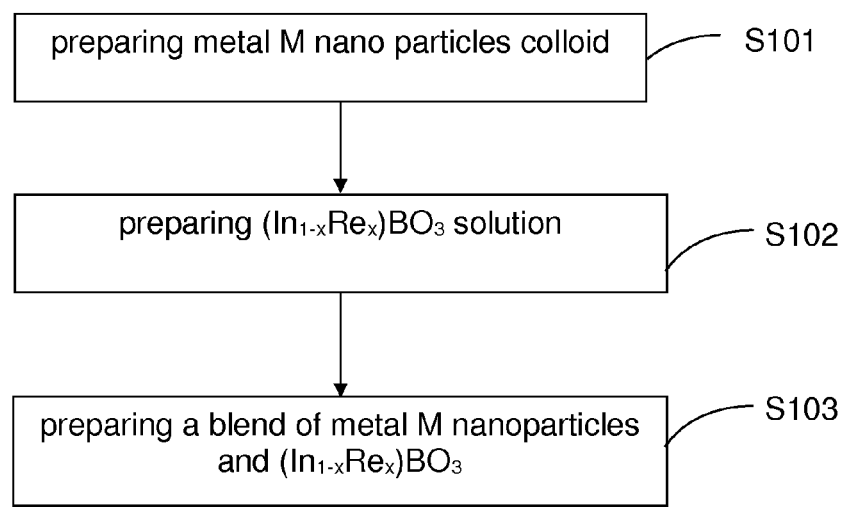
FIG. 2 is a flow chart of the preparation method of borate luminescent materials of the present invention.

Referring to FIG. 2, FIG. 2 shows the process of preparing borate luminescent materials of the embodiments of the present invention, which comprises the following steps.

Preparing metal M nano particle colloid in step S101

Dissolving metal M compound in solvent to prepare solution of metal M compound; then adding assistant agent to obtain mixed solution; subsequently, adding reducing agent solution into mixed solution, after the complete reaction, adding polyvinylpyrrolidone, stirring, obtaining metal M nano particles colloid; wherein, M represents metal nano particles, M is any one or two metals selected from gold, silver, platinum and palladium.

Preparation of metal M nano particle colloid of the embodiments of the present invention comprises:

preparing solution of metal M compound;

under the conditions of magnetic stirring, adding assistant agent, obtaining solution of metal M compound containing assistant agent;

preparing reducing agent solution;

under the conditions of magnetic stirring, adding reducing agent solution into said solution of metal M compound containing assistant agent, allow to react for 10 to 45 min, obtaining metal M nano particles colloid;

according to the volume of said metal M nano particles colloid, adding polyvinylpyrrolidone (PVP) to achieve a concentration ranged from 0.2 mg/mL to 0.2 g/mL, stirring for 3 to 24 h, obtaining treated metal M nano particles colloid;

wherein, metal M compound comprises all kind of soluble compound of metal M which can be reduced, and one or two compounds selected from silver nitrate chloroauric acid, chloroplatinic acid and palladium chloride are preferred. When two metal compounds are employed, such as chloroauric acid and silver nitrate, there was no molar ratio requirement between them, but the total molar amount of the two metal compounds must meet the requirement of the stoichiometric ratio in said chemical formula, thus the molar ratio is $1-x:x$, wherein, x is in the range of $0 < x \leq 0.5$;

reducing agent comprises hydrazine hydrate, ascorbic acid, sodium borohydride, potassium borohydride and others; assistant agent comprises at least one of polyvinylpyrrolidone, sodium citrate, cetyl trimethyl ammonium bromide, sodium dodecyl sulfate, sodium dodecyl sulfonate, the solvents employed in preparing mixed solution of metal M compound and assistant agent are water and ethanol, the addition amount of assistant agent can guarantee the concentration of said assistant agent in the final obtained metal nano particle colloid to be in the range of $1.5 \times 10^{-4}$ g/mL to $2.1 \times 10^{-3}$ g/mL;

the concentration of reducing agent solution of the embodiments of the present invention is not limited but in a preferred range of $1 \times 10^{-3}$ mol/L to $1 \times 10^{-2}$ mol/L, solvent of the reducing agent solution is water and ethanol.

Furthermore, the amount of reducing agent should be in excess, preferably, the molar ratio of reducing agent to metal M compound is in the range of 1.2:1 to 4.8:1; by using reducing agent in excess, all metal M ions in metal M compound are guaranteed to reduce to metal particles, the molar ratio of metal nano particles to $(In_{1-x}Re_x)BO_3$ in prepared borate luminescent materials is guaranteed to be in the range of $0 < z \leq 1 \times 10^{-2}$.

Preparing $(In_{1-x}Re_x)BO_3$ solution in step S102

According to the stoichiometric ratio of each element in the general formula $(In_{1-x}Re_x)BO_3$, weighing $In(NO_3)_3$, $Re(NO_3)_3$ and compound used as source of boron then adding into ethanol solution, dissolving and mixing to prepare mixed ethanol solution of $(In_{1-x}Re_x)BO_3$; wherein, x is in the range of $0 < x \leq 0.5$, Re is rare-earth element, Re comprises one or two elements selected from Tm, Tb, Eu, Sm, Gd, Dy and Ce;

wherein, compound used as source of boron comprises boric acid or borate ester, said borate ester comprises tributyl borate, trimethyl borate, triisopropyl borate ester and others. The borate ester of the present invention is subjected to hydrolysis, alcoholysis in ethanol solution, and forms colloid, which enables indium, rare-earth ions and metal nano particles to disperse well in colloid. This promotes luminescent intensity of said borate luminescent materials.

Furthermore, when boric acid is employed, the methods further comprise a step of adding citric acid monohydrate which is 1 to 3 times as much as total amounts of rare earth ions, the citric acid monohydrate can be added before the water bath step or during the water bath step, as a metal ion complexing agent, citric acid monohydrate can improve the stability of indium ions, rare earth ions in colloid, assuring the evenness of borate luminescent materials in water bath, increasing the luminescent intensity of borate luminescent materials.

As a preferred solution of the embodiment of the present invention, the molar amount of added boric acid or borate ester should exceed the molar amount of boron which is determined by stoichiometric ratio in $(In_{1-x}Re_x)BO_3$, the molar ratio of boric acid or borate ester is in excess of 0 to 50%.

Preparing a blend of metal M nanoparticles and $(In_{1-x}Re_x)BO_3$ in step S103

According to the stoichiometric ratio of each element in the general formula $(In_{1-x}Re_x)BO_3$ and M nanoparticles, adding the obtained metal M nano particles colloid into said mixed ethanol solution of $(In_{1-x}Re_x)BO_3$ in accordance with the molar ratio z, heating in a water bath at 75° C. to 90° C., and drying to obtain precursors, pre-burning and calcining the precursors, then cooling, grinding, obtaining borate luminescent materials, wherein, z is the molar ratio of M to $(In_{1-x}Re_x)BO_3$, z is in the range of $0 < z \leq 1 \times 10^{-2}$.

The step of conducting water bath can be divided into two processes, firstly, after adding metal M nano particles colloid, heating in a water bath at the temperature ranged from 75° C. to 90° C. for a certain time, the time is not limited, obtaining wet gel, then continue to heat in a water bath at the same temperature, obtaining colloid; also, it is allow not to proceed with water bath after obtaining wet gel. During the process of water bath, due to the volatilization of water, ethanol and others, the dryness of the initial matter of borate luminescent materials is continually increase.

Drying of the present embodiment of the present invention can comprise: firstly, drying at the temperature ranged from 60° C. to 80° C. for 1 h to 24 h, then drying at the temperature range from 80° C. to 150° C., the time is not limited.

Furthermore, pre-burning treatment is also included before the calcining treatment of the embodiment of the present invention, specifically, pre-burning the precursor at the temperature ranged from 300° C. to 800° C. for 2 h to 7 h. Because the pre-burning treatment can remove impurities in precursor, such as glycol, citric acid, eliminating the effects of such impurities on the lighting of borate luminescent materials, so the luminescent efficiency of borate luminescent materials is greatly increased.

Moreover, the calcining treatment of the present invention is to calcine in the air or reducing atmosphere at 800° C. to 1300° C. for 2 h to 6 h; reducing atmosphere comprises, such as nitrogen and hydrogen in a volume ratio of 95% to 5%, nitrogen and hydrogen in a volume ratio of 90% to 10%, hydrogen, carbon monoxide and other reducing atmosphere. Calcining in reducing atmosphere can prevent the rare-earth ions of luminescent materials from being oxidized, guaranteeing the luminescent performance of borate luminescent materials. In addition, by calcining, the crystal structure of said borate luminescent materials gets improved, and more conducive to light.

The present invention also provides uses of said borate luminescent materials in field emission display devices or light sources.

By the introduction of metal nano particles, taking the advantage of surface plasmon resonance effect of metal nano particles, said borate luminescent materials achieve significant enhancement to luminescent intensity, great increase of luminescent efficiency.

The preparation methods of the present invention, the used borate ester is subjected to hydrolysis, alcoholysis in ethanol solution, and forms colloid, which enables indium, rare-earth ions and metal nano particles to disperse well in colloid. This promotes luminescent intensity of said borate luminescent materials. Or, as a metal ion complexing agent, the used citric acid monohydrate can improve the stability of indium ions, rare earth ions in colloid, assuring the evenness of borate luminescent materials in water bath, increasing the luminescent intensity of borate luminescent materials; Calcining in reducing atmosphere can prevent the rare-earth ions of luminescent materials from being oxidized, guaranteeing the luminescent performance of borate luminescent materials. In addition, by calcining, the crystal structure of said borate luminescent materials gets improved, and more conducive to light; and said preparation methods are simple, no pollution, easy to control, low demand on equipment, easy to produce in industry.

EXAMPLE 1

Preparation of $(In_{0.99}Eu_{0.01})BO_3:1\times10^{-2}$ Au

The preparation method of $(In_{0.99}Eu_{0.01})BO_3:1\times10^{-2}$ Au of the present embodiment of the present invention comprises the following steps.

Preparing Au nano particles colloid:
weighing 20.6 mg of chloroauric acid ($AuCl_3 \cdot HCl \cdot 4H_2O$) and dissolving in 16.8 mL of deionized water, obtaining aqueous solution of chloroauric acid;
weighing 14 mg of sodium citrate and 6 mg of cetyl trimethyl ammonium bromide, adding into the aqueous solution of chloroauric acid while magnetically stirring;
weighing 1.9 mg of sodium borohydride and 17.6 mg of ascorbic acid, dissolving in 10 mL of deionized water, separately, obtaining 10 mL of $5\times10^{-3}$ mol/L aqueous solution of sodium borohydride and 10 mL of $1\times10^{-2}$ mol/L aqueous solution of ascorbic acid;
while magnetically stirring, adding 0.08 mL of aqueous solution of sodium borohydride into said aqueous solution of chloroauric acid containing sodium citrate and cetyl trimethyl ammonium bromide, stirring and reacting for 5 min, then adding 3.12 mL of $1\times10^{-2}$ mol/L aqueous solution of ascorbic acid, allow to react for 30 min, obtaining 20 mL of Au nano particles colloid containing $5\times10^{-3}$ mol/L of Au;
adding 2 g of PVP, stirring for 8 h, obtaining surface-treated Au nano particles colloid;
Preparing $(In_{0.99}Eu_{0.01})BO_3:1\times10^{-2}$ Au:
placing 4.95 mL of 1 mol/L $In(NO_3)_3$, 1 mL of 0.05 mol/L $Eu(NO_3)_3$ solution and 0.3092 g of $H_3BO_3$ into a beaker, stirring and dripping ethanol solution until all of solid dissolves;
adding 10 mL of said surface-treated $5\times10^{-3}$ mol/L Au nano particles colloid;
dissolving 2.1012 g of citric acid monohydrate (2 times as much as amount of rare earth metal ions) in ethanol, then adding into said solution;
placing the obtained solution in a 75° C. water bath, heating and stirring until wet gel forms;
drying in a 60° C. blast oven for 22 h, then drying completely at 110° C., obtaining precursor;
placing the precursor in a high-temperature furnace, pre-burning at 500° C. for 2 h, cooling to room temperature;
after grinding, placing it in a box-tube type furnace, in carbon monoxide atmosphere, calcining at 800° C. for 5 h, cooling naturally, the desired luminescent materials $(In_{0.99}Eu_{0.01})BO_3:1\times10^{-3}$ Au is obtained.

EXAMPLE 2

Preparation of $(In_{0.95}Tb_{0.05})BO_3:1\times10^{-3}$ Ag

The preparation method of $(In_{0.95}Tb_{0.05})BO_3:1\times10^{-3}$ Ag of the present embodiment of the present invention comprises the following steps.

Preparing Ag nano particles colloid:
weighing 3.40 mg of silver nitrate ($AgNO_3$) and dissolving in 18.4 mL of deionized water, obtaining aqueous solution of silver nitrate;
weighing 42 mg of sodium citrate, adding into the aqueous solution of silver nitrate while stirring;
weighing 5.7 mg of sodium borohydride and dissolving in 10 mL of deionized water, obtaining 10 mL of $1.5\times10^{-2}$ mol/L aqueous solution of sodium borohydride;
while stirring, adding 1.6 mL of $1.5\times10^{-2}$ mol/L aqueous solution of sodium borohydride into said aqueous solution of silver nitrate containing sodium citrate at once, allow to react for 10 min, obtaining 20 mL of Ag nano particles colloid containing $1\times10^{-3}$ mol/L of Ag;
adding 4 mg of PVP, stirring for 12 h, obtaining surface-treated Ag nano particles colloid;
Preparing $(In_{0.95}Tb_{0.05})BO_3:1\times10^{-3}$ Ag:
placing 4.75 mL of 1 mol/L $In(NO_3)_3$, 0.5 mL of 0.5 mol/L $Tb(NO_3)_3$ solution and 0.4637 g of $H_3BO_3$ (in excess of 50% by mol) into a beaker, stirring and dripping ethanol solution until all of solid dissolves;
placing 5 mL of said treated $1\times10^{-3}$ mol/L Ag nano particles colloid in beaker;
dissolving 3.1521 g of citric acid monohydrate (3 times as much as amount of rare earth metal ions) in ethanol, then adding into said solution;
placing the obtained solution in a 90° C. water bath, heating and stirring until wet gel forms;
drying in a 80° C. blast oven for 23 h, then drying completely at 110° C., obtaining precursor;
placing the precursor in a high-temperature furnace, pre-burning at 800° C. for 2 h, cooling to room temperature, after grinding, placing it in a box-tube type furnace, in the atmosphere of mixed gases of nitrogen and hydrogen (volume ratio is 90:10), calcining at 1150° C. for 3 h, cooling naturally, the desired luminescent materials $(In_{0.95}Tb_{0.05})BO_3:1\times10^{-3}$ Ag is obtained.

EXAMPLE 3

Preparation of $(In_{0.5}Eu_{0.3}Gd_{0.2})BO_3:1\times10^{-4}$ Pt

The preparation method of $(In_{0.5}Eu_{0.3}Gd_{0.2})BO_3:1\times10^{-4}$ Pt of the present embodiment of the present invention, comprises: preparing Pt nano particles colloid:
weighing 5.18 mg of chloroplatinic acid ($H_2PtCl_6 \cdot 6H_2O$) and dissolving in 17 mL of deionized water, obtaining aqueous solution of chloroplatinic acid;
weighing 8.0 mg of sodium citrate and 12.0 mg of sodium dodecyl sulfonate, adding into the aqueous solution of chloroplatinic acid while stirring;
weighing 0.38 mg of sodium borohydride, dissolving in 10 mL of deionized water, obtaining 10 mL of $1\times10^{-3}$ mol/L aqueous solution of sodium borohydride, meanwhile, preparing 10 mL of $1\times10^{-2}$ mol/L hydrazine hydrate solution;
dripping 0.4 mL of aqueous solution of sodium borohydride into said aqueous solution of chloroplatinic acid containing sodium citrate and sodium dodecyl sulfonate, stirring and reacting for 5 min, then dripping 2.6 mL of $1\times10^{-2}$ mol/L hydrazine hydrate solution, stirring and reacting for 40 min, obtaining 20 mL of Pt nano particles colloid containing $5\times10^{-4}$ mol/L of Pt;
adding 20 mg of PVP, magnetically stirring for 12 h, obtaining surface-treated Pt nano particles colloid;
Preparing $(In_{0.5}Eu_{0.3}Gd_{0.2})BO_3:1\times10^{-4}$ Pt:
placing 5 mL of 1 mol/L $In(NO_3)_3$, 6 mL of 0.5 mol/L $Eu(NO_3)_3$ solution, 4 mL of 0.5 mol/L $Gd(NO_3)_3$ solution and 0.7420 g of $H_3BO_3$ (in excess of 20% by mol) into a beaker, stirring and dripping ethanol solution until all of solid dissolves;

placing 2 mL of said treated $5 \times 10^{-4}$ mol/L Pt nano particles colloid in beaker;

dissolving 6.3042 g of citric acid monohydrate (3 times as much as amount of metal ions) in ethanol, then adding into said solution;

placing the obtained solution in a 80° C. water bath, heating and stirring until wet gel forms;

drying in a 70° C. blast oven for 22 h, then drying completely at 80° C., obtaining precursor;

placing the precursor in a high-temperature furnace, pre-burning at 300° C. for 7 h, cooling to room temperature, after grinding, placing it in a tube furnace, calcining at 1300° C. for 2 h, cooling naturally, the desired luminescent materials $(In_{0.5}Eu_{0.3}Gd_{0.2})BO_3:1 \times 10^{-4}$ Pt is obtained.

EXAMPLE 4

Preparation of $(In_{0.95}Tm_{0.05})BO_3:1 \times 10^{-4}$ Pd

The preparation method of $(In_{0.95}Tm_{0.05})BO_3:1 \times 10^{-4}$ Pd of the present embodiment of the present invention comprises the following steps.

Preparing Pd nano particles colloid:

weighing 0.43 mg of palladium chloride ($PdCl_2 \cdot 2H_2O$) and dissolving in 19.5 mL of deionized water, obtaining aqueous solution of palladium chloride;

weighing 11.0 mg of sodium citrate and 4.0 mg of sodium dodecyl sulfate, adding into the aqueous solution of chloroplatinic acid while stirring;

weighing 3.8 mg of sodium borohydride, dissolving in 10 mL of deionized water, obtaining $1 \times 10^{-2}$ mol/L reducing solution of sodium borohydride;

while stirring, rapidly adding 0.5 mL of $1 \times 10^{-2}$ mol/L aqueous solution of sodium borohydride into said aqueous solution of palladium chloride containing sodium citrate and sodium dodecyl sulfate, stirring and reacting for 20 min, obtaining 20 mL of Pd nano particles colloid containing $1 \times 10^{-4}$ mol/L of Pd;

adding 10 mg of PVP, and stirring for 8 h, obtaining surface-treated Pd nano particles colloid;

Preparing $(In_{0.95}Tm_{0.05})BO_3:1 \times 10^{-4}$ Pd:

placing 4.75 mL of 1 mol/L $In(NO_3)_3$, 5 mL of 0.05 mol/L $Tm(NO_3)_3$ solution and 1.3809 g of tributyl borate ($C_{12}H_{27}BO_3$, in excess of 20% by mol) into a beaker, stirring and dripping ethanol solution until all of solid dissolves;

placing 5 mL of said treated $1 \times 10^{-4}$ mol/L Pd nano particles colloid in beaker;

heating and stirring in a 85° C. water bath until wet gel forms;

drying in a 80° C. blast oven for 25 h, then drying completely at 150° C., obtaining precursor;

placing the precursor in a high-temperature furnace, pre-burning at 500° C. for 7 h, cooling to room temperature, after grinding, placing it in a box-type high-temperature furnace calcining at 900° C. for 5 h, cooling naturally, the desired luminescent materials $(In_{0.95}Tm_{0.05})BO_3:1 \times 10^{-4}$ Pd is obtained.

EXAMPLE 5

Preparation of $(In_{0.95}Sm_{0.05})BO_3:1 \times 10^{-3}$ Ag

The preparation method of $(In_{0.95}Sm_{0.05})BO_3:1 \times 10^{-3}$ Ag of the present embodiment of the present invention comprises the following steps.

Preparing Ag nano particles colloid:

weighing 3.40 mg of silver nitrate ($AgNO_3$) and dissolving in 18.4 mL of deionized water, obtaining aqueous solution of silver nitrate;

weighing 42 mg of sodium citrate, adding into the aqueous solution of silver nitrate while stirring;

weighing 5.7 mg of sodium borohydride, dissolving in 10 mL of deionized water, obtaining 10 mL of $1.5 \times 10^{-2}$ mol/L aqueous solution of sodium borohydride;

while stirring, adding 1.6 mL of $1.5 \times 10^{-2}$ mol/L aqueous solution of sodium borohydride into said aqueous solution of silver nitrate containing sodium citrate at once, allow to react for 10 min, obtaining 20 mL of Ag nano particles colloid containing $1 \times 10^{-3}$ mol/L of Ag;

adding 4 mg of PVP, stirring for 24 h, obtaining surface-treated Ag nano particles colloid;

Preparing $(In_{0.95}Sm_{0.05})BO_3:1 \times 10^{-3}$ Ag placing 4.75 mL of 1 mol/L $In(NO_3)_3$, 0.5 mL of 0.5 mol/L $Sm(NO_3)_3$ solution and 0.4637 g of $H_3BO_3$ (in excess of 50% by mol) into a beaker, stirring and dripping ethanol solution until all of solid dissolves;

placing 5 mL of said treated $1 \times 10^{-3}$ mol/L Ag nano particles colloid in beaker;

dissolving 3.1521 g of citric acid monohydrate (3 times as much as amount of rare earth metal ions) in ethanol, then adding into said solution;

placing the obtained solution in a 90° C. water bath, heating and stirring until wet gel forms;

drying in a 80° C. blast oven for 26 h, then drying completely at 130° C., obtaining precursor;

placing the precursor in a high-temperature furnace, pre-burning at 700° C. for 2 h, cooling to room temperature, after grinding, placing it in a box-tube type furnace, in the atmosphere of mixed gases of nitrogen and hydrogen (volume ratio is 90:10), calcining at 1250° C. for 2 h, cooling naturally, the desired luminescent materials $(In_{0.95}Sm_{0.05})BO_3:1 \times 10^{-3}$ Ag is obtained.

EXAMPLE 6

Preparation of $(In_{0.9}Dy_{0.10})BO_3:1 \times 10^{-4}$ Au

Preparing Au nano particles colloid:

weighing 20.6 mg of chloroauric acid ($AuCl_3 \cdot HCl \cdot 4H_2O$) and dissolving in 16.8 mL of deionized water, obtaining aqueous solution of chloroauric acid;

weighing 14 mg of sodium citrate and 6 mg of cetyl trimethyl ammonium bromide, adding into the aqueous solution of chloroauric acid while magnetically stirring;

weighing 1.9 mg of sodium borohydride and 17.6 mg of ascorbic acid, dissolving in 10 mL of deionized water, separately, obtaining 10 mL of $5 \times 10^{-3}$ mol/L aqueous solution of sodium borohydride and 10 mL of $1 \times 10^{-2}$ mol/L aqueous solution of ascorbic acid;

while stirring, adding 0.08 mL of aqueous solution of sodium borohydride into said aqueous solution of chloroauric acid containing sodium citrate and cetyl trimethyl ammonium bromide, stirring and reacting for 5 min, then adding 3.12 mL of $1 \times 10^{-2}$ mol/L aqueous solution of ascorbic acid, allow to react for 30 min, obtaining 20 mL of Au nano particles colloid containing $5 \times 10^{-3}$ mol/L of Au;

pipetting 1 mL of $5 \times 10^{-3}$ mol/L Au nano particles colloid, adding 3 mg of PVP to Au nano particles colloid in a beaker, stirring for 8 h, obtaining surface-treated Au nano particles colloid;

Preparing $(In_{0.9}Dy_{0.10})BO_3:1\times10^{-4}$ Au:

placing 4.5 mL of 1 mol/L $In(NO_3)_3$, 1 mL of 0.5 mol/L $Dy(NO_3)_3$ solution and 0.4019 g of $H_3BO_3$ (in excess of 30% by mol) into a beaker, stirring and dripping ethanol solution until all of solid dissolves;

placing 0.1 mL of said treated $5\times10^{-3}$ mol/L Au nano particles colloid in a beaker;

dissolving 4.2028 g of citric acid monohydrate (4 times as much as amount of metal ions) in ethanol, then adding into said solution;

placing the obtained solution in a 90° C. water bath, heating and stirring until wet gel forms;

drying in a 80° C. blast oven for 24 h, then drying completely at 100° C., obtaining precursor;

placing the precursor in a high-temperature furnace, pre-burning at 800° C. for 4 h, cooling to room temperature, after grinding, placing it in a box-type high-temperature furnace, calcining at 1150° C. for 2 h, cooling naturally, the desired luminescent materials $(In_{0.9}Dy_{0.10})BO_3:5\times10^{-5}$ Au is obtained.

EXAMPLE 7

Preparation of $(In_{0.85}Tb_{0.10}Ce_{0.05})BO_3:2\times10^{-5}$ Pt/Au

The preparation method of $(In_{0.85}Tb_{0.10}Ce_{0.05})BO_3:2\times10^{-5}$ Pt/Au of the present embodiment of the present invention comprises the following steps.

Preparing Pt/Au nano particles colloid:

weighing 10.7 mg of chloroauric acid ($AuCl_3.HCl.4H_2O$) and 13.56 mg of chloroplatinic acid ($H_2PtCl_6.6H_2O$), dissolving in 26 mL of deionized water, obtaining mixed solution of chloroauric acid/chloroplatinic acid;

weighing 22 mg of sodium citrate and 20 mg of PVP, adding into said mixed solution while stirring;

weighing 5.7 mg of sodium borohydride and dissolving in 10 mL of deionized water, obtaining 10 mL of $1.5\times10^{-2}$ mol/L aqueous solution of sodium borohydride;

while stirring, adding 4 mL of $1.5\times10^{-2}$ mol/L aqueous solution of sodium borohydride into said mixed solution at once, allow to react for 20 min, obtaining 30 mL of Pt/Au nano particles colloid containing $1.7\times10^{-3}$ mol/L of total metal;

2.5 mL of obtained Pt/Au nano particles colloid, adding 12 mg of PVP into Pt/Au nano particles colloid, stirring for 6 h, obtaining surface-treated Pt/Au nano particles colloid;

Preparing $(In_{0.85}Tb_{0.10}Ce_{0.05})BO_3:2\times10^{-4}$ Pt/Au:

placing 4.25 mL of 1 mol/L $In(NO_3)_3$, 1 mL of 0.5 mol/L $Tb(NO_3)_3$ solution, 2.5 mL of 0.1 mol/L of $Ce(NO_3)_3$ solution and 0.4019 g of $H_3BO_3$ (in excess of 30% by mol) into a beaker, stirring and dripping ethanol solution until all of solid dissolves;

placing 0.6 mL of said treated 0.6 mL $1.7\times10^{-3}$ mol/L Pt/Au nano particles colloid in a beaker;

dissolving 4.2028 g of citric acid monohydrate (4 times as much as amount of metal ions) in ethanol, then adding into said solution;

placing the obtained solution in a 80° C. water bath, heating and stirring until wet gel forms;

drying in a 60° C. blast oven for 21 h, then drying completely at 110° C., obtaining precursor;

placing the precursor in a high-temperature furnace, pre-burning at 800° C. for 4 h, cooling to room temperature, after grinding, placing it in a box-type high-temperature furnace, in carbon monoxide atmosphere, calcining at 1250° C. for 3 h, cooling naturally, the desired luminescent materials $(In_{0.85}Tb_{0.10}Ce_{0.05})BO_3:2\times10^{-4}$ Pt/Au is obtained.

EXAMPLE 8

Preparation of $(In_{0.9}Tb_{0.1})BO_3:2\times10^{-5}$ Pt/Au

The preparation method of $(In_{0.9}Tb_{0.1})BO_3:2\times10^{-5}$ Pt/Au of the present embodiment of the present invention comprises the following steps.

Preparing Pt/Au nano particles colloid:

weighing 10.7 mg of chloroauric acid ($AuCl_3.HCl.4H_2O$) and 13.56 mg of chloroplatinic acid ($H_2PtCl_6.6H_2O$), dissolving in 26 mL of deionized water, obtaining mixed solution of chloroauric acid/chloroplatinic acid;

weighing 22 mg of sodium citrate and 20 mg of PVP, adding into said mixed solution while stirring;

weighing 5.7 mg of sodium borohydride and dissolving in 10 mL of deionized water, obtaining 10 mL of $1.5\times10^{-2}$ mol/L aqueous solution of sodium borohydride;

while stirring, adding 4 mL of $1.5\times10^{-2}$ mol/L aqueous solution of sodium borohydride into said mixed solution at once, allow to react for 20 min, obtaining 30 mL of Pt/Au nano particles colloid containing $1.7\times10^{-3}$ mol/L of total metal;

pipetting 2.5 mL of obtained Pt/Au nano particles colloid, adding 12 mg of PVP into Pt/Au nano particles colloid, stirring for 6 h, obtaining surface-treated Pt/Au nano particles colloid;

Preparing $(In_{0.9}Tb_{0.1})BO_3:2\times10^{-5}$ Pt/Au:

placing 4.5 mL of 1 mol/L $In(NO_3)_3$, 1 mL of 0.5 mol/L $Tb(NO_3)_3$ solution and 0.4019 g of $H_3BO_3$ (in excess of 30% by mol) into a beaker, stirring and dripping ethanol solution until all of solid dissolves;

placing 0.6 mL of said treated 0.6 mL $1.7\times10^{-3}$ mol/L Pt/Au nano particles colloid in a beaker;

dissolving 4.2028 g of citric acid monohydrate (4 times as much as amount of metal ions) in ethanol, then adding into said solution;

placing the obtained solution in a 80° C. water bath, heating and stirring until wet gel forms;

drying in a 60° C. blast oven for 22 h, then drying completely at 110° C., obtaining precursor;

placing the precursor in a high-temperature furnace, pre-burning at 800° C. for 5 h, cooling to room temperature, after grinding, placing it in a box-tube type furnace, in the atmosphere of mixed gases of nitrogen and hydrogen (volume ratio is 95:5), calcining at 1200° C. for 3 h, cooling naturally, the desired luminescent materials $(In_{0.9}Tb_{0.1})BO_3:2\times10^{-5}$ Pt/Au is obtained.

EXAMPLE 9

Preparation of $(In_{0.95}Eu_{0.05})BO_3:1\times10^{-3}$ Ag

The preparation method of $(In_{0.95}Eu_{0.05})BO_3:1\times10^{-3}$ Ag of the present embodiment of the present invention comprises the following steps.

Preparing Ag nano particles colloid:

weighing 3.40 mg of silver nitrate ($AgNO_3$) and dissolving in 18.4 mL of deionized water, obtaining aqueous solution of silver nitrate;

weighing 42 mg of sodium citrate, adding into the aqueous solution of silver nitrate while stirring;

weighing 5.7 mg of sodium borohydride and dissolving in 10 mL of deionized water, obtaining 10 mL of $1.5\times10^{-2}$ mol/L aqueous solution of sodium borohydride;

while stirring, adding 1.6 mL of $1.5 \times 10^{-2}$ mol/L aqueous solution of sodium borohydride into said aqueous solution of silver nitrate containing sodium citrate at once, allow to react for 10 min, obtaining 20 mL of Ag nano particles colloid containing $1 \times 10^{-3}$ mol/L of silver;

adding 4 mg of PVP, stirring for 12 h, obtaining surface-treated Ag nano particles colloid;

Preparing $(In_{0.95}Eu_{0.05})BO_3:1\times 10^{-3}$ Ag:

placing 4.75 mL of 1 mol/L $In(NO_3)_3$, 0.5 mL of 0.5 mol/L $Eu(NO_3)_3$ solution and 0.4637 g of $H_3BO_3$ (in excess of 50% by mol) into a beaker, stirring and dripping ethanol solution until all of solid dissolves;

placing 5 mL of said treated $1 \times 10^{-3}$ mol/L Ag nano particles colloid in beaker;

dissolving 3.1521 g of citric acid monohydrate (3 times as much as amount of rare earth metal ions) in ethanol, then adding into said solution;

placing the obtained solution in a 90° C. water bath, heating and stirring until wet gel forms;

drying in a 80° C. blast oven for 23 h, then drying completely at 110° C., obtaining precursor;

placing the precursor in a high-temperature furnace, pre-burning at 800° C. for 7 h, cooling to room temperature, after grinding, placing it in a box-tube type furnace, in the atmosphere of mixed gases of nitrogen and hydrogen (volume ratio is 90:10), calcining at 1200° C. for 3 h, cooling naturally, the desired luminescent materials $(In_{0.95}Eu_{0.05})BO_3: 1\times 10^{-3}$Ag is obtained.

To prepare luminescent materials $(In_{0.95}Sm_{0.05})BO_3$ as a comparison using the same method as in Example 5 of the present invention.

Referring to FIG. 1, FIG. 1 is a luminescence spectrum of fluorescent powders prepared in Example 9 of the present invention, which is excited by cathode ray under 5 kv acceleration voltage. Herein, curve a is emission spectrum of luminescent materials $(In_{0.95}Eu_{0.05})BO_3$ added metal nano particles Ag; curve b is emission spectrum of luminescent materials $(In_{0.95}Eu_{0.05})BO_3$. It can be seen from FIG. 1 that, after being doped with metal Ag, the luminous intensity of luminescent materials is increased by about 83%.

The luminescent effect of borate luminescent materials prepared in Example 3~8 of the present invention is similar to that in Example 9, so it will not be discussed in detail here.

Hence, luminous intensity of borate luminescent materials prepared in embodiments of the present invention is greatly increased, it has outstanding advantages, by contrast with borate luminescent materials without adding metal nano particles.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

What is claimed is:

1. Borate luminescent materials, wherein the borate luminescent material is a blend of metal M nanoparticles and $(In_{1-x}Re_x)BO_3$, x is in the range of $0<x\leq 0.5$, Re is rare-earth element, Re is one or two elements selected from Tm, Tb, Eu, Sm, Gd, Dy and Ce; M represents metal nano particles, M is any one or two metals selected from gold, silver, platinum and palladium; z is in the range of $0<z\leq 1\times 10^{-2}$, z is the molar ratio of M to $(In_{1-x}Re_x)BO_3$.

2. Preparation methods of borate luminescent materials, comprising:

preparing metal M nano particles colloid: dissolving metal M compound in solvent to prepare solution of metal M compound; then adding assistant agent to obtain mixed solution; subsequently, adding reducing agent solution into mixed solution, after the complete reaction, adding polyvinylpyrrolidone, stirring, obtaining metal M nano particles colloid; wherein, M represents metal nano particles, M is any one or two metals selected from gold, silver, platinum and palladium;

preparing $(In_{1-x}Re_x)BO_3$ solution: according to the stoichiometric ratio of each element in the general formula $(In_{1-x}Re_x)BO_3$, weighing $In(NO_3)_3$, $Re(NO_3)_3$ and compound used as source of boron then adding into ethanol solution, dissolving and mixing to obtain mixed ethanol solution of $(In_{1-x}Re_x)BO_3$; wherein, x is in the range of $0<x\leq 0.5$, Re is rare-earth element, Re is one or two elements selected from Tm, Tb, Eu, Sm, Gd, Dy and Ce;

preparing a blend of metal M nanoparticles and $(In_{1-x}Re_x)BO_3$: according to the molar ratio z of M to $(In_{1-x}Re_x)BO_3$, adding the obtained said metal M nano particles colloid into said mixed ethanol solution of $(In_{1-x}Re_x)BO_3$, heating in a water bath at 75° C. to 90° C., and drying to obtain precursors, pre-burning and calcining said precursors, then cooling, grinding, obtaining borate luminescent materials, wherein, z is the molar ratio of M to $(In_{1-x}Re_x)BO_3$, z is in the range of $0<z\leq 1\times 10^{-2}$.

3. Preparation methods of borate luminescent materials according to claim 2, wherein, in said step of preparing metal M nano particles colloid, said metal M compound is one or two compounds selected from silver nitrate, chloroauric acid, chloroplatinic acid and palladium chloride; said solvent is mixed solvent of water and ethanol; said assistant agent is at least one of polyvinylpyrrolidone, sodium citrate, cetyl trimethyl ammonium bromide, sodium dodecyl sulfate, and sodium dodecyl sulfonate; in said reducing agent solution, a reducing agent comprises hydrazine hydrate, ascorbic acid, sodium borohydride, and potassium borohydride.

4. Preparation methods of borate luminescent materials according to claim 2, wherein, the addition of assistant agent can make the concentration of assistant agent in obtained metal M nano particles colloid in the range of $1.5 \times 10^{-4}$ g/mL to $2.1 \times 10^{-3}$ g/mL; in said reducing agent solution, the concentration of reducing agent is in the range of $1 \times 10^{-3}$ mol/L to $1 \times 10^{-2}$ mol/L.

5. Preparation methods of borate luminescent materials according to claim 2, wherein, in said step of preparing metal M nano particles colloid, the molar ratio of said reducing agent to said metal M compound is in the range of 1.2:1 to 4.8:1.

6. Preparation methods of borate luminescent materials according to claim 2, wherein, in said step of preparing $(In_{1-x}Re_x)BO_3$ solution, said compound used as source of boron is boric acid or borate ester.

7. Preparation methods of borate luminescent materials according to claim 6, wherein, when said compound used as source of boron is boric acid, addition of citric acid monohydrate is also included; the molar ratio of said citric acid monohydrate to said Re is in the range of 1 to 3:1.

8. Preparation methods of borate luminescent materials according to claim 2, wherein, in said step of preparing a blend of metal M nanoparticles and $(In_{1-x}Re_x)BO_3$, said pre-burning treatment is: pre-burning said precursor at the temperature ranged from 300° C. to 800° C. for 2 h to 7 h.

9. Preparation methods of borate luminescent materials according to claim 2, wherein, in said step of preparing a blend of metal M nanoparticles and $(In_{1-x}Re_x)BO_3$, said calcining treatment is: calcining in the air or reducing atmosphere, at the temperature ranged from 800° C. to 1300° C. for 2 h to 6 h.

* * * * *